United States Patent
Sherwood

[11] Patent Number: 6,148,634
[45] Date of Patent: Nov. 21, 2000

[54] MULTISTAGE RAPID PRODUCT REFRIGERATION APPARATUS AND METHOD

[75] Inventor: Gregory J. Sherwood, North Oaks, Minn.

[73] Assignee: 3M Innovative Properties Company, St. Paul, Minn.

[21] Appl. No.: 09/299,369

[22] Filed: Apr. 26, 1999

[51] Int. Cl.[7] .................................................. F25D 17/02
[52] U.S. Cl. .............................. 62/434; 62/430; 62/335; 62/114
[58] Field of Search .............................. 62/335, 430, 434, 62/114

[56] References Cited

U.S. PATENT DOCUMENTS

| | | | |
|---|---|---|---|
| 4,484,449 | 11/1984 | Muench | 62/79 |
| 4,565,069 | 1/1986 | MacCracken | 62/66 |
| 4,831,830 | 5/1989 | Swenson | 62/59 |
| 4,864,831 | 9/1989 | Hino | 62/123 |
| 5,038,850 | 8/1991 | Choi | 165/10 |
| 5,042,262 | 8/1991 | Gyger et al. . | |
| 5,157,925 | 10/1992 | Denton et al. | 62/11 |
| 5,307,641 | 5/1994 | Kooy | 62/59 |
| 5,323,618 | 6/1994 | Yoshida et al. | 62/149 |
| 5,335,508 | 8/1994 | Tippmann | 62/129 |
| 5,386,709 | 2/1995 | Aaron | 62/109 |
| 5,687,579 | 11/1997 | Vaynberg | 62/175 |
| 5,695,688 | 12/1997 | Nimitz et al. | 252/305 |
| 5,713,211 | 2/1998 | Sherwood . | |
| 5,735,133 | 4/1998 | Voss et al. | 62/66 |
| 5,761,921 | 6/1998 | Hori et al. | 62/238.4 |
| 5,778,685 | 7/1998 | Singh et al. | 62/66 |
| 5,784,893 | 7/1998 | Furuhama et al. | 62/333 |
| 5,819,549 | 10/1998 | Sherwood . | |
| 5,823,010 | 10/1998 | Chao | 62/434 |
| 5,827,446 | 10/1998 | Merchant et al. . | |
| 5,948,879 | 8/1999 | Sada et al. | 62/430 |

FOREIGN PATENT DOCUMENTS

| | | |
|---|---|---|
| 475 533 | 7/1969 | Switzerland . |
| 2 173 886 | 10/1986 | United Kingdom . |
| WO96/40834 | 12/1996 | WIPO . |

OTHER PUBLICATIONS

Eric Granryd and Åke Melinder, "Secondary refrigerants for indirect refrigeration and heat pump systems," *Scanref International*, 4, pp. 14, 16–20 (1994).

Howard W. Sibley, "Refrigeration," *Encyclopedia of Chemical Technology*, Fourth Ed., vol. 21, pp. 128–149 (1997).

Greg Sherwood, "Secondary Heat Transfer Systems and the Application of a New Hydrofluorether", Presented at the Oct., 1995, International CFC & Halon Alternatives Conference, Washington, D.C., U.S.A., pp. 1–11.

1995 Ashrae Handbook, HVAC Applications, I–P Edition, Chapter 40, "Thermal Storage", pp. 40.1–40.22.

1998 Ashrae Handbook, Refrigeration, SI Edition, Chapter 4, "Secondary Coolants in Refrigeration Systems", pp. 4.1–4.6.

*Primary Examiner*—William Doerrler
*Assistant Examiner*—Mark Shulman

[57] ABSTRACT

A multistage refrigeration system is disclosed, and particularly a system with a thermal storage reservoir disposed in a secondary refrigeration loop of the system. The reservoir stores thermal reservoir material in heat exchange relation with the refrigerant in that secondary refrigeration loop. A primary refrigeration loop transfers heat from the secondary refrigeration loop to ambient. A third refrigeration loop absorbs heat from a product to be cooled and transfers that heat to the secondary refrigeration loop. The thermal reservoir material may undergo a liquid/solid phase change, and preferably has a freezing point at about 20° F. (−7° C.). The multistage refrigeration system of the present invention is particularly adapted for use in stadium or arena settings, where rapid cooling of mass quantities of canned or bottled beverages for immediate consumption is desired.

22 Claims, 3 Drawing Sheets

MULTISTAGE RAPID PRODUCT REFRIGERATION APPARATUS AND METHOD

BACKGROUND OF THE INVENTION

The present invention relates to multistage refrigeration systems and processes, and in particular to the use of a thermal reservoir in an intermediate refrigeration loop for storing thermal reservoir material in heat exchange relation with the refrigerant in that intermediate refrigeration loop.

In its simplest form, a refrigeration system provides a means for transferring heat away from an object or space to be cooled. Various schemes have been developed to accomplish this end. The heat transfer agents or media used in refrigeration systems known in the art include water, aqueous brines, alcohols, glycols, ammonia, hydrocarbons, ethers, and various halogen derivatives of these materials. While many of these materials provide effective heat transfer media under certain conditions, physical considerations eliminate many of them from use in various settings. Such considerations include adverse environmental impact, since many known heat transfer media have been implicated in the depletion of the ozone layer, and thus have been banned from use. Another factor is toxicity. For example, ammonia and many ethylene glycols have a level of toxicity that make them dangerous to handle and unsuitable for commercial food handling environments. Some heat transfer agents are flammable materials, such as some ethers and some hydrocarbons. The risk of flammability is particularly great where the heat transfer media is subjected to large positive pressures within the refrigeration cycle. Other heat transfer agents are disfavored because they are in a gaseous state at normal operating temperatures. Again, ammonia is an example of this type of refrigerant. Gaseous heat transfer media requires special high pressure equipment, such as pressure regulators and reinforced tubing, that are not required for refrigerants that remain in a liquid state through most or all of the refrigeration system's operating cycle. In addition, high pressure systems are prone to leakage. Some other heat transfer media are corrosive in nature, and thus not preferred. Many of the aqueous brines fall into this category, and thus require special handling provisions such as Teflon™-lined conduits and interfaces, which add significantly to the overall cost of the refrigeration system. Furthermore, restrictions on the selection of materials usable with corrosive agents decreases the overall efficiency of these refrigeration systems.

A relatively new type of refrigeration system is known as a secondary loop refrigeration system. Such a system has shown significant advantages in terms of energy efficiency over conventional refrigeration systems, particularly in a supermarket environment. Secondary loop refrigeration systems are more compact in design, can be factory built, and are capable of operating with an extremely small charge of refrigerant. Furthermore, in secondary loop refrigeration systems, the vapor compression process of the refrigeration cycle is centralized, and can be operated from a remote location. Thus, the compressor in a secondary loop refrigeration system can be place on a rooftop, in a ventilated machine room, or in any other convenient location where it will not occupy valuable floor space or contribute to background noise, and where the effects of possible refrigerant leakage are minimized. Further, since the primary refrigerant loop running through the compressor is segregated from the secondary refrigerant loop used to cool the goods being refrigerated, the primary refrigerant loop may utilize ammonia or other high efficiency refrigerants that are unsuitable for use as direct refrigerants in many applications.

Sherwood, U.S. Pat. No. 5,819,549 (which is incorporated by reference herein), discloses secondary loop refrigeration systems. In one embodiment (Example 12 in the Sherwood '549 patent), a secondary loop refrigeration system is disclosed for use at stadiums and arenas. The refrigeration problem presented at such venues is quite different from that faced in the supermarket environment. At any event where a large number of people will gather for a few hours (and in particular, at sporting and entertainment events), there is a need to have mass quantities of cooled beverages on hand for immediate consumption by the thousands or tens of thousands of patrons at the event. For example, there will be about 63,500 spectators at a sold-out Minnesota Vikings home football game at the Hubert A. Humphrey Metrodome in Minneapolis, Minn. The spectators will typically consume 29,500 16-ounce cans of beer, as sold individually throughout the stadium by beer vendors, and 5,800 20-ounce plastic bottles of soda, as sold individually throughout the stadium by soda vendors. All of these sales take place within approximately a three to three and one-half hour period, and thus the operator of the stadium must necessarily have a suitable quantity of chilled beer cans and soda bottles on hand when the gates open.

This presents a rather unique challenge in terms of refrigeration. Of course, a traditional refrigeration chamber could be used to slowly cool the required quantity of beer and soda, if the venue had a cooler large enough. However, providing a cooler of that size would be impractical, for the type of usage incurred. Rather, a more appropriate solution is a "blast cooler" which will quickly chill the beer and soda (or other products which require quick chilling) for rapid distribution and consumption in such a stadium or arena setting. This reduces the footprint necessary for the cooling apparatus, and also reduces the time necessary for cooling. Another constraint placed on such venues are back-to-back events. For instance, in the Metrodome, it is possible to hold a Minnesota Golden Gophers college football game on a Saturday evening (ending about 10:00 p.m.) to be followed by a Minnesota Vikings professional football game on a Sunday afternoon (with the gates opening at about 10:30 a.m.).

While it may work to rapidly cool cans and bottles of beverages quickly in bulk, the secondary refrigeration system disclosed for stadiums or arenas in Example 12 of the Sherwood '549 patent is commercially undesirable because it requires a large reservoir of secondary refrigerant. Such refrigerant, in its preferred form, is relatively expensive, and such a large reservoir (e.g., approximately 40 gallons) would make such a refrigeration system prohibitively expensive.

There thus remains the need for a refrigeration system that is suitable for providing the "blast chilling" effect needed for rapid chilling of massive quantities of product, such as beer or soda, for stadium event use, but that is economical and efficient in operation. Further, such a system would preferably use a secondary loop refrigeration agent which is nontoxic, nonflammable, environmentally friendly and does not require the use of high pressures. These and other needs are provided by the present invention, as disclosed herein.

BRIEF SUMMARY OF THE INVENTION

The present invention provides a multistage refrigeration system. The system has a first refrigeration loop with a first refrigerant disposed therein, a second refrigeration loop with a second refrigerant disposed therein, and a third refrigeration loop with a third refrigerant disposed therein. The system includes a first heat exchanger for transferring heat from the second refrigerant to the first refrigerant, and a second heat exchanger for transferring heat from the third refrigerant to the second refrigerant. A thermal reservoir is provided in the second refrigeration loop. The thermal reservoir stores a thermal reservoir material in heat exchange relation with the second refrigerant.

In a preferred embodiment, the second refrigerant is selected from the group consisting of perfluorocarbons (PFCs), perfluoropolyethers (PFEs), hydrofluorocarbons (HFCs), hydrofluoroethers (HFEs), hydrochlorofluorocarbons (HCFCs), hydrochlorofluoroethers (HCFEs), chlorofluorocarbons (CFCs), hydrochlorocarbons (HCCs), hydrobromocarbons (HBCs), fluorinated compounds containing at least one aromatic moiety, and perfluoroiodides (PFIs). Preferably, the thermal reservoir has a freezing point ranging from about 0° to −40° C., and more preferably, a freezing point of about −7° C. The third refrigerant is preferably air. In the preferred embodiment, the refrigeration system further includes a conduit in the second refrigeration loop for diverting the second refrigerant to selectively bypass the second heat exchanger.

The invention also takes the form of a multistage refrigeration process which includes cooling a first refrigerant in a first refrigerant loop by transferring heat from the first refrigerant to the ambient temperature, and cooling a second refrigerant in a second refrigerant loop by transferring heat from the second refrigerant to the first refrigerant in a first heat exchanger. The process further includes cooling a third refrigerant in a third refrigerant loop by transferring heat from the third refrigerant to the second refrigerant in a second heat exchanger. The process further includes cooling a thermal reservoir material disposed in a thermal reservoir in the second refrigerant loop until a desired temperature for the thermal reservoir material is attained by transferring heat from the thermal reservoir material to the second refrigerant in the thermal reservoir, and cooling the second refrigerant by transferring heat retained therein from the third refrigerant to the thermal reservoir material in the thermal reservoir.

In a preferred embodiment of the multistage refrigeration process of the present invention, the third refrigerant loop includes a cooling chamber, and the process further comprises transferring heat from objects in the cooling chamber to the third refrigerant. In a further embodiment, the process includes cooling the objects in the cooling chamber to a predetermined final temperature, removing the objects from the cooling chamber at a desired removal rate, and pulsing the rate of circulation of the second refrigerant through the second refrigeration loop to maintain a suitable temperature in the cooling chamber until all of the objects have been removed therefrom. In one embodiment of the multistage refrigeration process, the process includes excluding the second heat exchanger from the second refrigerant flow until the thermal reservoir material has reached the desired temperature. In yet another embodiment of the multistage refrigeration process, the thermal reservoir material undergoes a phase change from a liquid state to a solid state as it approaches the desired temperature while heat is transferred from the thermal reservoir material to the second refrigerant.

BRIEF DESCRIPTION OF THE DRAWINGS

In this disclosure, a multistage refrigeration system is schematically illustrated, and disclosed in several embodiments. In the drawing figures, like reference numerals are used to indicate common features or components of the inventive system.

While the above-identified drawing figures set forth a preferred embodiment of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principle of the invention.

DETAILED DESCRIPTION OF THE PREFERRED EMBODIMENTS

As used herein, the term "multistage refrigeration system" refers to a refrigeration system in which one or more heat transfer media is used to transfer energy from a heat source to a primary refrigeration loop.

The term "third refrigeration loop" refers to the path over which a third refrigerant medium travels while it is being cycled between the heat source and a second refrigeration loop.

The term "third refrigerant medium" or "third refrigerant" refers to the heat transfer medium in the third refrigeration loop.

The term "secondary refrigeration loop" refers to the path over which a second refrigerant medium travels while it is being cycled between the third refrigeration loop and the primary refrigeration loop.

The term "second refrigerant medium" or "second refrigerant" refers to the heat transfer medium in the second refrigeration loop.

The term "primary refrigeration loop" refers to that portion of a multistage refrigeration system where heat is transferred to the external environment by way of a compressor.

The term "primary refrigerant medium" or "first refrigerant" refers to the heat transfer medium used in the primary refrigeration loop.

The present invention includes a refrigeration system comprising a blast chiller enclosure for temporary containment of product to be chilled; product heat transfer means for transferring heat from the product in the enclosure to a product heat transfer medium; intermediate heat transfer means for transferring heat from the product heat transfer medium to an intermediate heat transfer medium; primary heat transfer means for transferring heat from the intermediate heat transfer medium to a primary heat transfer medium; and thermal storage means for transferring heat to and from the intermediate heat transfer medium.

Figure 1:
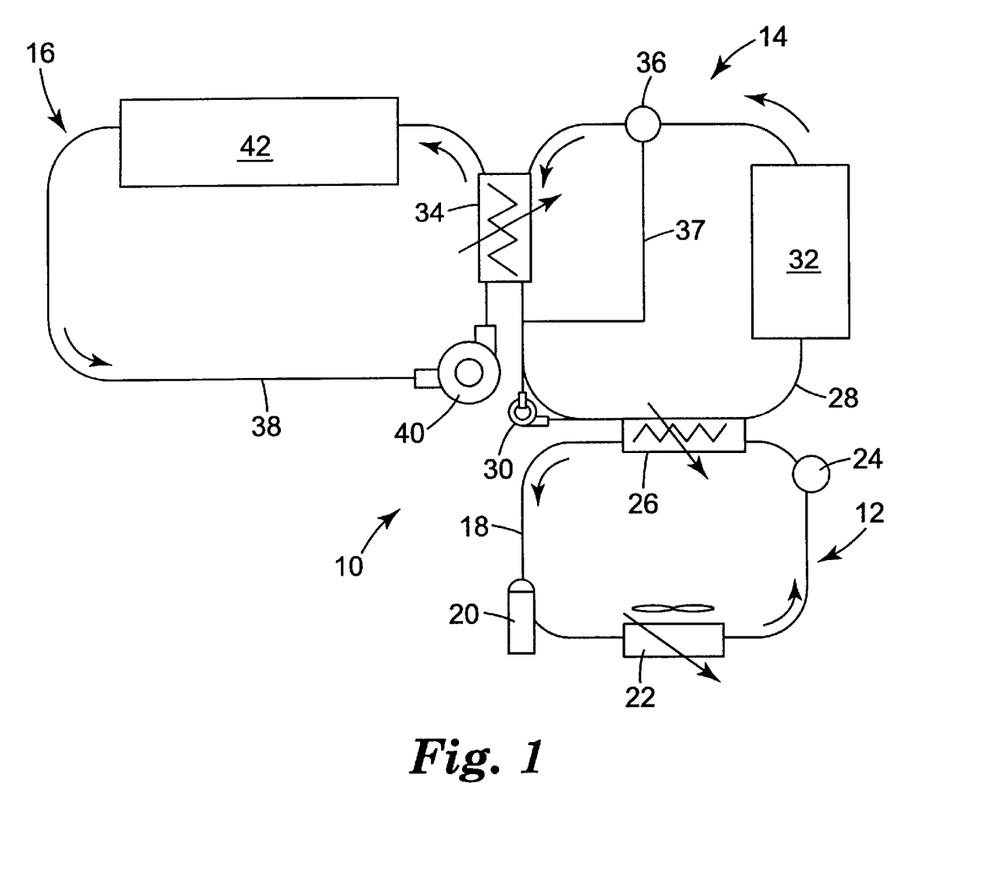
FIG. 1 is a schematic drawing of a multistage refrigeration system suitable for quick chilling applications in a stadium setting.

FIG. 1 illustrates the configuration of a multistage refrigertion system 10 which includes three refrigeration loops, a first refrigeration loop 12, a second refrigeration loop 14 and a third refrigeration loop 16.

The first refrigeration loop 12 is defined by a first refrigerant line 18 which connects, in series, a compressor 20, ambient air heat exchange 22, expansion valve 24 and first heat exchanger 26. A first or primary refrigerant medium is circulated through the first refrigerant line 18. After being warmed in the first heat exchanger 26, the first refrigerant medium has heat extracted therefrom in the compressor 20 and ambient heat air exchanger 22, with that heat being expelled to the environment. In the process, the first refrigerant medium is liquified and cooled. The first refrigerant medium is then expanded (via expansion valve 24) and returned to the first heat exchanger 26.

The second refrigeration loop 14 is defined by a second refrigerant line 28. Second refrigerant medium is circulated through the second refrigerant line 28 by a pump 30, past the first heat exchanger 26, a thermal reservoir 32 and a second heat exchanger 34. The second refrigerant line 28 includes a three-way valve 36 between the thermal reservoir 32 and second heat exchanger 34. A bypass line 37 connects the three-way valve 36 to a portion of the second refrigerant line 28 downstream from the second heat exchanger 34. The three-way valve 36 can be selectively activated to divert the second refrigerant medium in the second refrigerant line 28 to a path which traverses the second refrigerant line 28 but bypasses the second heat exchanger 34 (via a bypass line 37). The second refrigerant medium is a liquid which has heat removed therefrom by the first heat exchanger 26 and absorbs heat from the second heat exchange 34. The thermal reservoir 32 also absorbs heat and provides heat relative to the second refrigerant medium, as discussed further below. Throughout its operation, the second refrigerant medium does not undergo a phase change from a liquid state to a gaseous state, or vice versa.

The third refrigeration loop 16 is defined by a third refrigerant line 38. A third refrigerant medium is moved through the third refrigerant line 38 by a suitable "pump" 40 which directs the third refrigerant medium through the second heat exchanger 34 and then into a cooling chamber 42 before recirculation to the pump 40. Preferably, the third refrigerant medium is air, and thus the pump 40 comprises a blower and the third refrigerant line 38 comprises suitable conduit and ducting for directing the air therealong. Throughout its operation, the third refrigerant medium does not undergo a phase change from a gaseous state to a liquid state, or vice versa.

The cooling or air circulation chamber 42 is sized to hold the specific objects or products to be cooled. For instance, the chamber may be the size of a walk-in cooler (e.g., 10 feet by 10 feet in floor area) for holding a number of cases of canned and bottled beverages to be cooled, in a stacked, dense arrangement. The cooling chamber 42 is designed so that the air (the first refrigerant medium) is diverted to "blow upon" or pass by the objects to be cooled and then exits the cooling chamber 42 for re-cooling and recirculation. Heat from the objects to be cooled is transferred via the air through the second heat exchanger 34 into the second refrigerant medium in the second refrigeration loop 14.

Figure 2:
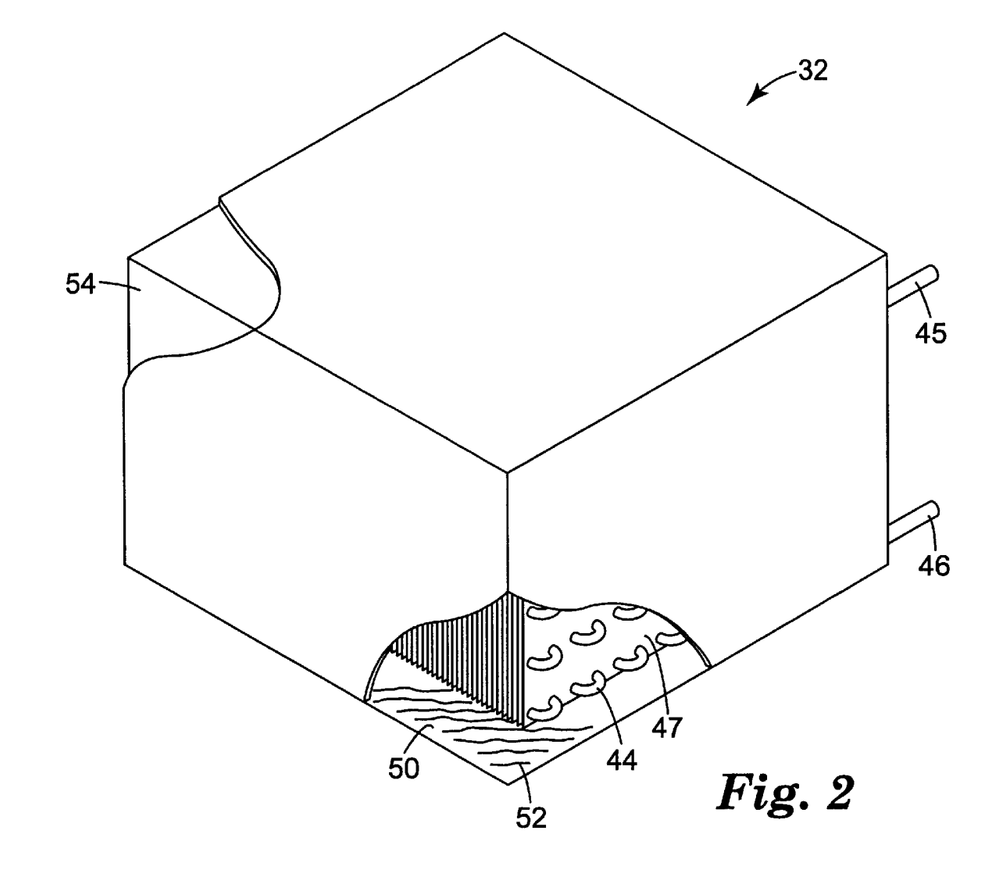
FIG. 2 is a schematic perspective illustration of a thermal reservoir suitable for use in the multistage refrigeration system of FIG. 1.

The thermal reservoir 32 in the second refrigeration loop 14 illustrated in FIG. 2. The thermal reservoir 32 defines an enclosure that includes serpentine tubing 44 throughout which allows the second refrigerant medium to traverse the interior of the thermal reservoir 32. The second refrigerant medium (from the second refrigerant line 28) enters the serpentine tubing 44 through an inlet 45 and exits the serpentine tubing 44 through an outlet 46 (to return to the second refrigerant line 28). The serpentine tubing 44 passes through a plurality of heat exchange fins 47 disposed within the thermal reservoir 32. The thermal reservoir 32 includes a reservoir or chamber 50 which includes the tubing 44 and fins 47 therein. A thermal reservoir material 52 is also resident within the chamber 50. The thermal reservoir 32 is designed to accommodate the thermal reservoir material 52 in a liquid state (at a temperature above its freezing point) and in a solid state (at a temperature below its freezing point). The thermal reservoir material 52 is illustrated in its solid state as at 54 in FIG. 2.

A useful operational temperature range for the thermal reservoir material 52 in the thermal reservoir 32 loop is from about 0° C. to −40° C. The process and the product cooling requirements will dictate the preferred melting temperature and capacity of the thermal reservoir. For example, a bottle cooling process may have melting temperature ranging from 0° C. to −7° C. to avoid product freezing; whereas, a freezing process may have a temperature ranging from −10° C. to −25° C. The preferred thermal reservoir material 52 is water (i.e., frozen as ice), which is capable of storing heat at an amount of 144 BTU/lb (1 cal/g) of material at the freezing point of 0° C. Additives such as salts or glycols can be mixed with the water to reduce its freezing point, for example, down to below 0° F. (−18° C.), though the resultant heat storage capacity of the thermal reservoir is decreased. In general, mixtures of water with salts tends to maintain the desired hard, crystalline structure of the frozen water mixture and yet maintain 70 to 80 percent of the heat storage capacity. In contrast, mixtures of water with glycols, such as propylene glycol, tend to freeze to a glassy state, which removes about half of the heat storage capacity. The water/glycol mixtures tend not to have a crisp melting point, but have a range of melting temperatures as energy is added to the reservoir.

For the thermal reservoir material 52, a melting point of about 20° F. (−7° C.) is most desirable to achieve a heat transfer condition for the second refrigerant medium in the second refrigeration loop 14 which is thermally positioned to attain an optimum overall rate of heat transfer in the third refrigeration loop 16. A 20° F. (−7° C.) melting point can be achieved by mixing any of a number of common salts (e.g., sodium chloride or calcium chloride) with water. The amount of salt required depends on its freezing point depression ability. Preferably, the thermal reservoir material 52 is an aqueous brine, such as concentrated aqueous solutions of sodium chloride, calcium chloride or sodium carbonate. These materials are cost-effective refrigerants and are excellent heat transfer liquids, although they are corrosive to metal (especially ferrous) components, necessitating the incorporation of a toxic corrosion inhibitor. A preferred thermal reservoir material melting at 20° F. (−7° C.) can be made by mixing 20 percent by weight of potassium formate with water.

When very low melting points are desired for the thermal reservoir, non-aqueous materials or mixtures can be employed, such as FLUORINERT™ FC-70 fluid, which has a melting point of −25° C. (available from Minnesota Mining and Manufacturing Company, St. Paul, Minn.).

The thermal reservoir 32 is designed to act as a heat sink. To prepare for quickly cooling products in the cooling chamber 42, the thermal reservoir material 52 is cooled, even possibly to a point where it undergoes a phase change from a liquid state to a solid state. The thermal reservoir material 52 is a high heat capacity liquid such as the type of salt and water mixture noted above. The thermal reservoir 32 is cooled by circulating the second refrigerant medium through the second refrigeration loop 14, from the first heat exchanger 26 through the thermal reservoir 32. The tubing 44 and fins 47 define a heat exchanger within the thermal reservoir used to cool the thermal reservoir material 52 as the coolant (second refrigerant medium) passes through the thermal reservoir 32. In the case of an aqueous solution, the proportion of water and freezing point depression (i.e., salt) is determined such that the thermal reservoir material 52 undergoes a solid/liquid phase change at a desired temperature (for example, at about 20° F. (−7° C.)). The cooling time for the thermal reservoir material 52 could take several hours, and is primarily a function of the capacity of the compressor 20 in the first refrigeration loop 12 and the size of the thermal reservoir 32. By freezing the appropriate amount of thermal reservoir material 52, a heat sink is provided that can quickly absorb the energy delivered to it by the second refrigerant medium in the second refrigerant line 28 during operation.

In a product cooling cycle operation (to cool mass quantities of canned or bottled beverages for consumption in a relatively short period of time), the primary refrigeration loop is activated to chill the primary refrigerant medium therein. The secondary refrigeration loop is also activated and heat is transferred from the secondary refrigerant medium to the primary refrigerant medium via the first heat exchanger 26. The three-way valve 36 in the second refrigerant line 28 is activated and the bypass valve 36 is switched to divert the second refrigerant medium through bypass line 37 (thereby bypassing the second heat exchanger 34). After traversing the first heat exchanger 26, the chilled second refrigerant medium enters the serpentine tubing 44 of the thermal reservoir 32. The chilled second refrigerant medium in turn absorbs heat from the thermal reservoir material 52 in the thermal reservoir 32, thereby driving the thermal reservoir material 52 to a desired temperature (a temperature which may result in freezing of the thermal reservoir material 52 to a solid state 54, as illustrated in FIG. 2). The warmed second refrigerant medium exits the thermal reservoir 32 and is then re-cooled by the first heat exchanger 26. Once the thermal reservoir material 52 is at or about the desired temperature, the bypass valve 36 is switched to divert second refrigerant medium to the second heat exchanger 34 and the third refrigeration loop 16 is activated.

In operation, air (the third refrigerant medium) is circulated through the third refrigeration loop 16 by the blower 40, absorbs heat from the product to be cooled in the cooling chamber 42, and is discharged into the second heat exchanger 34. Heat from the air is transferred through the second heat exchanger 34 into the second refrigerant medium in the second refrigerant line 28. The cooled air continues circulation in the third refrigerant line 38 to again remove heat from the relatively warmer products in the cooling chamber 42. The second refrigerant is pumped from the second heat exchanger 44 through the first heat exchanger 26 and into the thermal reservoir 32. Heat from the second refrigerant is transferred into the thermal reservoir material 52 in the thermal reservoir 32 so that the second refrigerant medium, as it emerges from the thermal reservoir 32, is at a lower temperature and is then circulated back to the second heat exchanger 34. The thermal reservoir 32 is designed to convert the thermal reservoir material 52 therein from a solid state to a liquid state, thus maintaining a constant temperature heat sink for the second refrigerant medium to deliver energy as it passes therethrough. Operating in this mode, the thermal load is transferred from the product to be cooled in the cooling chamber 42 to the thermal reservoir material 52 at a high rate, for the air circulation temperature in the third refrigeration loop 16 is far below the final desired temperature of the product in the cooling chamber 42. Upon completion of this process (when the product has reached its final desired temperature), the circulation rate of the second refrigerant medium can be stopped or pulsed to maintain the temperature in the cooling chamber 42 until all of the product is removed therefrom. During the transfer of heat from the product 42 in the cooling chamber 42, the primary refrigeration loop 12 operates (if at all) on a minimal basis due to the presence of the thermal reservoir 32. This conserves a significant amount of energy. Should the thermal reservoir material 52 provide, after time, an insufficient heat sink for the second refrigerant medium, the primary refrigertion loop 12 is activated to chill the second refrigerant medium as it traverses the first heat exchanger 26.

Upon completion of the product cooling process, circulation of the second refrigerant medium in the second refrigeration loop 14 is switched to bypass the second heat exchanger. The second refrigerant medium thus circulates from the thermal reservoir 32 to the first heat exchanger 26. This removes the stored energy in the thermal reservoir 32, which is then rejected to the atmosphere by the first refrigeration loop 12 and freezes the thermal reservoir material 52 in the thermal reservoir 32 in reparation for another product cooling cycle. The cooling chamber design is not limited to the cooling of beverages alone, but may apply to any application that requires rapid cooling.

Suitable secondary refrigerants for use in this invention include organic or inorganic liquids having a boiling point ranging from about 15° C. to about 200° C., preferably ranging from about 50° C. to about 110° C., and a freezing point ranging from about 0° C. to about −150° C. Such liquids include but are not limited to aqueous brines, non-halogenated organic derivatives, and various halogenated (i.e., fluorine- and/or chlorine-substituted) organic derivatives. For general information describing secondary refrigerants, see Eric Granryd and Åke Melinder, "Secondary refrigerants for indirect refrigeration and heat pump systems," *Scanref International*, 4, pp. 15–20 (1994), and Howard W. Sibley, "Refrigeration," *Encyclopedia of Chemical Technology*, Fourth Ed., Vol. 21, pp. 128–149 (1997).

Aqueous brines, such as concentrated aqueous solutions of sodium chloride, calcium chloride or sodium carbonate, are the most cost-effective refrigerants and are excellent heat transfer liquids. However, in order for the aqueous brine to remain liquid below about 20° F. (−7° C.), a very high concentration of salt (i.e., in excess of 15 percent by weight) is required. At this high salt concentration, the aqueous brine becomes very viscous and requires a significant increase in pump energy as compared to water to circulate through the relatively restricted secondary loop system. Also, the aqueous brine is very corrosive to the metal (especially ferrous) components of the system, necessitating the incorporation of a toxic corrosion inhibitor. Water without added salt could be used as a secondary loop refrigerant only when the reservoir temperature is kept above the freezing point of water (32° F., 0° C.). However, for maximum heat transfer effectiveness, the reservoir temperature preferably is maintained at or near 20° F. (−7° C.), thus necessitating the addition of a suitable salt.

Suitable non-halogenated organic derivatives and their aqueous solutions include alcohols and their aqueous solutions, glycols and their aqueous solutions, aliphatic and aromatic hydrocarbons, glycol ethers and esters, hydrocarbon ethers and esters, and silicones. These non-halogenated organic derivatives can perform well as secondary loop refrigerants, as they are relatively inexpensive, are good heat transfer liquids, are relatively low in toxicity, are generally environmentally compatible, and exhibit a large liquid temperature range. However, non-halogenated organic derivatives which exhibit a desirably low viscosity at low temperature are generally flammable. Examples of suitable non-halogenated organic derivatives include but are not limited to methyl alcohol and its aqueous solutions, ethyl alcohol and its aqueous solutions, isopropyl alcohol and its aqueous solutions, ethylene glycol and its aqueous solutions, propylene glycol and its aqueous solutions, TYFOXIT™ 1.15 and TYFOXIT™ 1.21 (inhibited alkali ethanate solutions, available from Tyforop Chemie GmbH, Hamburg, Germany), UCON™ fluids (random copolymers of ethylene and propylene oxide, available from Union Carbide Corp., Danbury, Conn.), MOBILTHERM™ 594 (a mineral oil, available from Mobil Oil Corp., Fairfax, Va.), DOWTHERM™ J and Q fluids (mixtures of alkylated aromatic isomers, available from Dow Corning Corp., Midland, Mich.), d-limonene (optically active terpene, $C_{10}H_{16}$, derived as extract from orange and lemon oils), THERMINOL™ D-12 fluid (synthetic hydrocarbon, available from Solutia, Inc., St. Louis, Mo.). THERMINOL™ LT fluid (alkylbenzene, $C_{10}H_{14}$, available from Solutia, Inc.), SANTOTHERM™ 60 fluid (available from Solutia, Inc., ISOBAR™ M fluid (hydrocarbon mixture, available from Exxon Corp., New York N.Y.), MARLOTHERM™ L (available from Hüls Aktiengesellschaf , Marl, Germany), BAYSILON™ M3 fluid (polydimethylsiloxane, available from Bayer Corp., Pittsburgh, Pa.), and SYLTHERM™ XLT and 800 fluids (polydimethylsiloxanes, available from Dow Corning Corp.).

Halogenated organic derivatives, especially fluorine-substituted organic derivatives, are the preferred secondary loop refrigerants, exhibiting the combination of good heat transfer properties, low corrosivity, a large liquid temperature range, non-flammability, low toxicity and environmental friendliness. Halogenated organic derivatives performing satisfactorily as secondary refrigerants include perfluorocarbons (PFCs), perfluoropolyethers (PFEs), hydrofluorocarbons (HFCs), hydrofluoroethers (HFEs), hydrochlorofluorocarbons (HCFCs), hydrochlorofluoroethers (HCFEs), chlorofluorocarbons (CFCs), hydrochlorocarbons (HCCs), fluorinated compounds containing at least one aromatic moiety, and perfluoroiodides (PFIs).

Until recently, liquid CFCs such as CFC-113 ($CCl_2F_2CCl_2F_2$) and CFC-11 ($CCl_3F$) were perhaps ideal candidates for secondary refrigerants, exhibiting excellent performance, low cost and no toxicological or safety drawback. However, as of the 1987 Montreal Protocol, CFCs have been legislated out of most commercial use situations due to their proven degradation of the stratospheric ozone layer.

Useful PFCs include perfluorinated liquids which can be single compounds but usually will be a mixture of such compounds. The PFCs have molecular structures which can be straight-chained, branched-chained or cyclic, or a combination thereof, such as perfluoroalkylcycloaliphatic, are fluorinated up to at least 95 molar percent substitution of the carbon chain, and are preferably free of ethylenic unsaturation. The skeletal chain of the molecular structure can contain catenary (i.e., "in-chain") oxygen, trivalent nitrogen or hexavalent sulfur heteroatoms bonded only to carbon atoms, such heteroatoms providing stable linkages between fluorocarbon groups and not interfering with the inert character of the liquid. The inert perfluorochemical liquid will preferably have about 6 to about 18 carbon atoms, the maximum number being dictated by the desired boiling point. Preferred PFCs typically contain about 60 to about 76 weight percent carbon-bonded fluorine. U.S. Pat. Nos. 2,500,388 (Simons), 2,519,983 (Simons), 2,594,272 (Kauck et al.), 2,616,927 (Kauck et al.) and 4,788,339 (Moore et al.), all of which are herein incorporated by reference, describe the preparation of inert perfluorinated compounds, such as perfluorinated hydrocarbons, ethers, tertiary amines and aminoether, said preparation involving electrochemical fluorination in anhydrous HF medium. PFCs useful in this invention also include those described in *Encyclopedia of Chemical Technology*, Kirk-Othmer, Third Ed., Vol. 10, pages 874–81, John Wiley & Sons (1980).

Useful PFCs include perfluoro-4-methylmorpholine, perfluorotriethylamine, perfluoro-2-ethyltetrahydrofuran, perfluoro-2-butyltetrahydrofuran, perfluorohexane, perfluoro-4-isopropylmorpholine, perfluorodibutyl ether, perfluoroheptane, perfluorooctane, perfluorotripropylamine, perfluorononane, perfluorotributylamine, perfluorotriamylamine, perfluorotrihexylamine, perfluorodihexyl ether, perfluoro[2-(diethylamino)ethyl-2-(N-morpholino) ethyl]ether, perfluorotetrahydrophenanthrene, and mixtures thereof. Preferred inert fluorochemical liquids include perfluorotributylamine, perfluorotriamylamine, perfluorohexane, perfluoro-2-butyltetrahydrofuran, perfluoroheptane, perfluorooctane, and mixtures thereof, especially perfluoroheptane and perfluorooctane. Commercially available PFCs useful in this invention include FLUORINERT™ liquids, e.g., FC-40, FC-43, FC-70, FC-71, FC-72, FC-75, FC-77 and FC-84, described in the 1990 product bulletin #98-0211-5347-7(101.5) NPI, "FLUORINERT™ Liquids," of Minnesota Mining and Manufacturing Company, St. Paul, Minn., and mixtures thereof.

Useful PFEs are described in U.S. Pat. Nos. 3,250,807 (Fritz et al.), 3,250,808 (Moore et al.), and 3,274,239 (Selman), all of which are herein incorporated by reference. These PFEs are derived by polymerization of perfluoropropylene oxide followed by stabilization, e.g., with fluorinating agents. Commercially available PFEs useful in this invention include KRYTOX™ K fluorinated oils (available from E. I. du Pont de Nemours & Co., Wilmington, Del.), FLUTEC™ PP inert fluorocarbon fluids (available from ISC Chemicals Ltd., Bristol, England) and GALDEN™ HT fluids (available from Ausimont Corp., Thorofare, N.J.).

Useful HFCs include organic compounds having a 3- or 8-carbon backbone substituted with both hydrogen and fluorine atoms but essentially no other atoms, such as chlorine. The carbon backbone can be straight, branched or mixtures of these. Useful HFCs include compounds having more than approximately 5 molar percent fluorine substitution, or less than 95 molar percent fluorine substitution, based on the total number of hydrogen and fluorine atoms bonded to carbon, and specifically excludes PFCs, PFEs, CFCs, HCFCs and HCFEs. Useful HFCs can be selected from:

(1) HFCs as represented below in Formula I:

$C_3H_nF_{8-n}$, wherein $1 \leq n \leq 4$     (Formula I)

Useful HFCs of Formula I include $CH_2FCF_2CFH_2$, $CF_2HCH_2CF_3$, $CF_3CH_2CF_2H$ and $CF_2HCFHCF_2H$.

(2) Linear or branched HFCs as represented below in Formula II:

$C_4H_nF_{10-n}$, wherein $1 \leq n \leq 5$     (Formula II)

Useful HFCs of Formula II include $CHF_2(CF_2)_2CF_2H$, $CF_3CF_2CH_2CH_2F$, $CH_3CF(CHF_2)CHF_2$, $CF_3CH_2CF_2CH_2F$, $CF_3CH_2CF_2CH_3$, $CH_3CHFCF_2CF_3$ $CF_3CH_2CH_2CF_3$, $CH_2FCF_2CF_2CH_2F$, $CHF_2CH(CF_3)CF_3$ and $CHF(CF_3)CF_2CF_3$.

(3) Linear or branched HFCs as represented below in Formula III:

$C_5H_nF_{12-n}$, wherein $1 \leq n \leq 6$     (Formula III)

Useful HFCs of Formula III include $CH_3CHFCH_2CF_2CF_3$, $CF_3CH_2CF_2CH_2CF_3$, $CF_3CHFCHFCF_2CF_3$, CH$_3$CHFCHFCF$_2$CF$_3$, CF$_3$CH$_2$CH$_2$CF$_2$CF$_3$, CH$_3$CHFCF$_2$CF$_2$CF$_3$, CF$_3$CF$_2$CF$_2$CH$_2$CH$_3$, CH$_3$CF$_2$CF$_2$CF$_2$CF$_3$ CF$_3$CH$_2$CHFCH$_2$CF$_3$, CH$_2$FCF$_2$CF$_2$CF$_2$CF$_3$, CF$_3$CH$_2$CF$_2$CH$_2$CH$_2$F, CHF$_2$CF$_2$CF$_2$CF$_2$CF$_3$, CH$_3$CF(CF$_2$H)CHFCHF$_2$, CH$_3$CF (CHFCHF$_2$)CF$_3$, CH$_3$CH(CF$_2$CF$_3$)CF$_3$, CHF$_2$CH(CHF$_2$) CF$_2$CF$_3$, CHF$_2$CF(CHF$_2$)CF$_2$CF$_3$ and CHF$_2$CF$_2$CF(CF$_3$)$_2$.

(4) Cyclic HFCs as represented below in Formula IV:

C$_5$H$_n$F$_{10-n}$, wherein 1≦n≦5    (Formula IV)

Useful HFCs of Formula IV include (5) Linear or branched HFCs as represented below in Formula V:

C$_6$H$_n$F$_{14-n}$, wherein n≦7    (Formula V)

Useful HFCs of Formula V include (CF$_3$CH$_2$)$_2$CHCF$_3$, CH$_3$CH$_2$CFHCFHCF$_2$CF$_3$, CH$_3$CHFCF$_2$CHFCHFCF$_3$, CH$_2$FCHFCH$_2$CF$_2$CHFCF$_3$, CF$_2$HCHFCF$_2$CF$_2$CHFCF$_2$H, CH$_2$FCF$_2$CF$_2$CF$_2$CF$_2$H, CHF$_2$CF$_2$CF$_2$CF$_2$CF$_2$CHF$_2$, CHF$_2$CF$_2$CF$_2$CF$_2$CF$_3$, CH$_3$CH(CHFCH$_2$CF$_3$)CF$_3$, CH$_3$CF (CF$_2$H)CHFCHFCF$_3$, CH$_3$CF(CF$_3$)CHFCHFCF$_3$, CH$_3$CF$_2$C(CF$_3$)$_2$CF$_2$CH$_3$, CH$_3$CF(CF$_3$)CF$_2$CF$_2$CF$_3$, CHF$_2$CF$_2$CH(CF$_3$)CF$_2$CF$_3$ and CHF$_2$CF$_2$CF(CF$_3$)CF$_2$CF$_3$.

(6) Linear or branched HFCs as represented below in Formula VI:

C$_7$H$_n$F$_{16-n}$, wherein n≦8    (Formula VI)

Useful HFCs of Formula VI include CH$_3$CH$_2$CH$_2$CHFCF$_2$CF$_2$CF$_3$, CH$_3$CHFCH$_2$CF$_2$CHFCF$_2$CF$_3$, CH$_3$(CF$_2$)$_5$CH$_3$, CH$_3$CH$_2$(CF$_2$)$_4$CF$_3$, CF$_3$CH$_2$CH$_2$(CF$_2$)$_3$CF$_3$, CH$_2$FCF$_2$CHF(CF$_2$)$_3$CF$_3$, CF$_3$CF$_2$CF$_2$CHFCHFCF$_2$CF$_3$, CF$_3$CF$_2$CF$_2$CHFCF$_2$CF$_2$CF$_3$, CH$_3$CH$_2$CH$_2$CHFCF(CF$_3$)$_2$, CH$_3$CH(CF$_3$)CF$_2$CF$_2$CF$_2$CH$_3$, CH$_3$CF(CF$_3$) CH$_2$CFHCF$_2$CF$_3$, CH$_3$CF(CF$_2$CF$_3$)CHFCF$_2$CF$_3$, CH$_3$CH$_2$CH(CF$_3$)CF$_2$CF$_2$CF$_3$, CHF$_2$CF(CF$_3$)(CF$_2$)$_3$CH$_2$F and CHF$_2$CF(CF$_3$)(CF$_2$)$_3$CF$_3$; and (7) Linear or branched HFCs as represented below in Formula VII:

C$_8$H$_n$F$_{18-n}$, wherein n≦9    (Formula VII)

Useful HFCs of Formula VII include CH$_3$CH$_2$CH$_2$CH$_2$CF$_2$CF$_2$CF$_2$CF$_3$, CH$_3$(CF$_2$)$_6$CH$_3$, CHF$_2$CF(CF$_3$)(CF$_2$)$_4$CHF$_2$, CHF$_2$CF(CF$_3$)(CF$_2$)$_4$CHF$_2$, CH$_3$CH$_2$CH(CF$_3$)CF$_2$CF$_2$CF$_2$CF$_3$, CH$_3$CF(CF$_2$CF$_3$) CHFCF$_2$CF$_2$CF$_3$, CH$_3$CH$_2$CH$_2$CHFC(CF$_3$)$_2$CF$_3$, CH$_3$C (CF$_3$)$_2$CF$_2$CF$_2$CF$_2$CH$_3$, CH$_3$CH$_2$CH$_2$CF(CF$_3$)CF(CF$_3$)$_2$ and CH$_2$FCF$_2$CF$_2$CHF(CF$_2$)$_3$CF$_3$. The HFC can be used alone, as a mixture of two or more HFCs, or as a mixture with another secondary loop refrigerant. Useful commercially available HFCs include VERTREL™ fluids (available from E. I duPont de Nemours and Co.) and ZEORORA™ fluids (available from Nippon Zeon Co. Ltd., Tokyo, Japan).

Useful HFEs are chemical compounds minimally containing carbon, fluorine, hydrogen, one or more ether oxygen atoms, and optionally one or more additional heteroatoms within the carbon backbone, such as sulfur or nitrogen. The HFE can be straight-chained, branched-chained, or cyclic, or a combination thereof, such as alkylcycloaliphatic, and is preferably free of unsaturation. The HFE can preferably have from about 3 to about 15 carbon atoms. Preferred HFEs include two identifiable varieties: (1) segregated HFEs, wherein ether-bonded alkyl or alkylene, etc., segments of the HFE are either perfluorinated (e.g., perfluorocarbon) or non-fluorinated (e.g., hydrocarbon), but not partially fluorinated; and (2) non-segregated HFEs, wherein at least one of the ether-bonded segments is neither perfluorinated nor fluorine-free but is partially fluorinated (i.e., contains a mixture of fluorine and hydrogen atoms).

Segregated HFEs include HFEs which comprise at least one mono-, di-, or trialkoxy-substituted perfluoroalkane, perfluorocycloalkane, perfluorocycloalkyl-containing perfluoroalkane, or perfluorocycloalkylene-containing perfluoroalkane compound. These HFEs are described, for example, in WO 96/22356, and can be represented below in Formula VIII:

$$R_f—(O—R_h)_x$$    (Formula VIII)

wherein:

x is from 1 to about 3, and R$_f$ is a perfluorinated hydrocarbon group having a valency x, which can be straight, branched, or cyclic, etc., and preferably contains from about 3 to 12 carbon atoms, and more preferably contains from about 3 to 10 carbon atoms; each R$_h$ is independently a linear or branched alkyl group having from 1 to about 8 carbon atoms, a cycloalkyl-containing alkyl group having from 4 to about 8 carbon atoms, or a cycloalkyl group having from 3 to about 8 carbon atoms; wherein either or both of the groups R$_f$ and R$_h$ can optionally contain one or more catenary heteroatoms; wherein the sum of the number of carbon atoms in the R$_f$ group and the number of carbon atoms in the R$_h$ group(s) is preferably greater than or equal to 4.

Preferably, x is 1; R$_f$ is a perfluoroalkyl comprising from about 3 to 10 carbons, optionally containing one or more heteroatoms; and R$_h$ is an alkyl group having from 1 to about 6 carbon atoms. Most preferably, x is 1; R$_f$ is a linear or branched perfluoroalkyl groups having from 3 to about 8 carbon atoms; a perfluorocycloalkyl-containing perfluoroalkyl group having from 5 to about 8 carbon atoms; or a perfluorocycloalkyl group having from about 5 to 6 carbon atoms; R$_h$ is an alkyl group having from 1 to about 3 carbon atoms; and R$_f$ but not R$_h$ can contain one or more heteroatoms.

Representative HFEs as described by Formula VIII include the following:

$C_3F_7CF(OC_2H_5)CF(CF_3)_2$,
$C_2F_5CF(OC_2H_5)CF(CF_3)_2$,
$C_2F_5CF(OCH_3)CF(CF_3)_2$, and
$CF_3CF(OCH_3)CF(CF_3)_2$,
wherein cyclic structures designated with an interior "F" are perfluorinated. Each HFE can be used alone or in admixture with another HFE.

Particularly preferred segregated HFEs of Formula VIII include n-$C_3F_7OCH_3$, $(CF_3)_2CFOCH_3$, n-$C_4F_9OCH_3$, $(CF_3)_2$ $CFCF_2OCH_3$, n-$C_3F_7OC_2H_5$, n-$C_4F_9OC_2H_5$, $(CF_3)_2$ $CFCF_2OC_2H_5$, $(CF_3)_3COCH_3$, $CH_3O(CF_2)_4OCH_3$, $CH_3O$ $(CF_2)_6OCH_3$, and mixtures thereof. Commercially available segregated HFEs include NOVEC™ HFE-8401HT and HFE-8402HT engineered fluids (available from Minnesota Mining and Manufacturing Company, St. Paul, Minn.).

Segregated HFEs can be prepared by alkylation of perfluorinated alkoxides prepared by the reaction of a corresponding perfluorinated acyl fluoride or perfluorinated ketone with an anhydrous alkali metal fluoride (e.g., potassium fluoride or cesium fluoride) or anhydrous silver fluoride in an anhydrous polar aprotic solvent. (See, e.g., the preparative methods described in French Patent Publication No. 2,287,432 and German Patent Publication No. 1,294,949). Alternatively, a fluorinated tertiary alcohol can be allowed to react with a base (e.g., potassium hydroxide or sodium hydroxide) to produce a perfluorinated tertiary alkoxide which can then be alkylated by reaction with alkylating agent, such as described in U.S. Pat. No. 5,750,797, which is herein incorporated by reference.

Also useful as secondary refrigerants are azeotropes and azeotrope-like compositions which are blends of segregated HFEs with organic solvents. Especially useful are the azeotropes and azeotrope-like compositions consisting of blends of $C_4F_9OCH_3$, $C_4F_9OC_2H_5$ and $C_3F_7OCH_3$ with organic solvents.

Such blends of $C_4F_9OCH_3$ with organic solvents are described in U.S. patent application Ser. No. 08/604,002, which is herein incorporated by reference. Useful binary $C_4F_9OCH_3$/solvent azeotropes and azeotrope-like composition include blends of $C_4F_9OCH_3$ with the following solvents: straight chain, branched chain and cyclic alkanes having from 6 to 8 carbon atoms; cyclic and acyclic ethers having from 4 to 6 carbon atoms; acetone; chlorinated alkanes having 1, 3 or 4 carbon atoms; chlorinated alkenes having 2 carbon atoms; alcohols having from 1 to 4 carbon atoms; partially fluorinated alcohols having 2 to 3 carbon atoms; 1-bromopropane; acetonitrile; HCFC-225ca (1,1-dichloro-2,2,3,3,3-pentafluoropropane); and HCFC-225cb (1,3-dichloro-1,1,2,2,3-pentafluoropropane). Useful ternary $C_4F_9OCH_3$/solvent azeotropes and azeotrope-like compositions include blends of $C_4F_9OCH_3$ with the following solvents pairs: trans-1,2-dichloroethylene and alcohols having from 1 to 4 carbon atoms; trans-1,2-dichloroethylene and partially fluorinated alcohols having 2 to 3 carbon atoms; trans-1,2-dichloroethylene and acetonitrile; and HCFC-225 and alcohols having from 1 to 2 carbon atoms.

Such blends of $C_4F_9OC_2H_5$ with organic solvents are described in U.S. patent application Ser. No. 08/442399, which is herein incorporated by reference. Useful binary $C_4F_9OC_2H_5$/solvent azeotropes and azeotrope-like compositions include blends of $C_4F_9OC_2H_5$ with the following solvents: straight chain, branched chain and cyclic alkanes having from 6 to 8 carbon atoms; esters having 4 carbon atoms; ketones having 4 carbon atoms; disiloxanes having 6 carbon atoms; cyclic and acyclic ethers having from 4 to 6 carbon atoms; alcohols having from 1 to 4 carbon atoms; partially fluorinated alcohols having 3 carbon atoms; chlorinated alkanes having 3 or 4 carbon atoms; chlorinated alkenes having 2 or 3 carbon atoms; 1-bromopropane; and acetonitrile.

Such blends of $C_3F_7OCH_3$ with organic solvents are described in U.S. patent application Ser. No. 08/936,582, which is herein incorporated by reference. Useful binary $C_3F_7OCH_3$/solvent azeotropes and azeotrope-like compositions include blends of $C_3F_7OCH_3$ with the following solvents: straight chain, branched chain and cyclic alkanes having from 5 to 7 carbon atoms; methyl formate; acetone; methanol; 1,1,1,3,3,3-hexafluoro-2-propanol; methylene chloride and trans-1,2-dichloroethylene. Useful ternary $C_3F_7OCH_3$/solvent azeotropes and azeotrope-like compositions include blends of $C_3F_7OCH_3$ with the following solvents pairs: trans-1,2-dichloroethylene and methanol; trans-1,2-dichloroethylene and 1,1,1,3,3,3-hexafluoro-2-propanol; methylene chloride and methanol; and methylene chloride and 1,1,1,3,3,3-hexafluoro-2-propanol.

Useful non-segregated HFEs include omega-hydrofluoroalkyl ethers such as those described in U.S. Pat. No. 5,658,962 (Moore et al.), incorporated herein by reference, which can be described by the general structure shown in Formula IX:

$$X\text{---}[R_f'\text{---}O]_y R''H \qquad \text{(Formula IX)}$$

wherein:

X is either F, H, or a perfluoroalkyl group containing from 1 to 3 carbon atoms;

each $R_f'$ is independently selected from the group consisting of —$CF_2$—, —$C_2F_4$—, and —$C_3F_6$—;

R" is a divalent organic radical having from 1 to 6 carbon atoms, and is preferably perfluorinated; and y is an integer from 0 to 12;

wherein when X is F, R" contains at least one F atom.

Representative HFEs as described by Formula IX include $C_4F_9OC_2F_4H$, $HC_3F_6OC_3F_6H$, $HC_3F_6OCH_3$, $C_5F_{11}OC_2F_4H$, $C_6F_{13}OCF_2H$, $C_6F_{13}OC_2F_4OC_2F_4H$, c-$C_6F_{11}CF_2OCF_2H$, $C_3F_7OCH_2F$, $HCF_2O(C_2F_4O)_n(CF_2O)_mCF_2H$ wherein m=0 to 2 and n=0 to 3, $C_3F_7O[C(CF_3)$ $CF_2O]_pCFHCF_3$ wherein p=0 to 5, $C_4F_9OCF_2C(CF_3)_2CF_2H$, $HCF_2CF_2OCF_2C(CF_3)_2CF_2OC_2F_4H$, $C_7F_{15}OCFHC_3$, $C_8F_{17}OCF_2O(CF_2)_5H$ and $C_8F_{17}OC_2F_4OC_2F_4OC_2F_4OCF_2H$, and mixtures thereof. Preferred HFEs as described by Formula IX include $C_4F_9OC_2F_4H$, $C_4F_9OC_2F_4H$, $C_6F_{13}OCF_2H$, $HC_3F_6OC_3F_6H$, $C_3F_7OCH_2F$ and $HCF_2O(C_2F_4O)_n(CF_2O)_mCF_2H$ wherein m is from 0 to 2 and m is from 0 to 3, and mixtures thereof.

Non-segregated HFEs described by Formula IX can be prepared by decarboxylation of the corresponding precursor fluoroalkyl ether carboxylic acids and salts thereof or, preferably, the saponifiable alkyl esters thereof, as described in U.S. Pat. No. 5,658,962. Alternatively, omega-hydrofluoroalkyl ethers can be prepared by reduction of a corresponding omega-chlorofluoroalkyl ether (e.g., those omega-chlorofluoroalkyl ethers described in WO 93/11868 published application), which is also described in U.S. Pat. No. 5,658,962. Useful non-segregated (alpha-omega dihydro) HFEs are commercially available under the GALDEN H™ trade name from Ausimont Corp.

Useful HCFEs include those described by the general structure shown in Formula X:

$$R_f''\text{---}O\text{---}C_aH_bF_cCl_d \qquad \text{(Formula X)}$$

wherein $R_f''$ is a perfluoroalkyl group preferably having at least about 3 carbon atoms, most preferably from 3 to 10 carbon atoms, and optionally containing a catenary heteroatom such as nitrogen or oxygen; "a" preferably is from about 1 to 6; "b" is at least 1; "c" can range from 0 to about 2; "d" is at least 1; and a+c+d is equal to 2b+1. Such HCFEs are described in U.S. patent application Ser. No. 08/931105, which is incorporated herein by reference. Useful HCFEs include c-$C_6F_{11}$—$OCHCl_2$, c-$C_6F_{11}$—$OCH_2Cl$, $(CF_3)_2CFOCHCl_2$, $(CF_3)_2CFOCH_2Cl$, $CF_3CF_2CF_2OCH_2Cl$, $CF_3CF_2CF_2OCH_2Cl$, $(CF_3)_2CFCF_2OCHCl_2$, $(CF_3)_2CFCF_2OCH_2Cl$, $CF_3CF_2CF_2CF_2OCHCl_2$, $CF_3CF_2CF_2CF_2OCHCl_2$, c-$C_6F_{11}$—$CF_2OCHCl_2$, c-$C_6F_{11}$— $CF_2OCH_2Cl$, $(CF_3)_2CFCF_2OCHClCH_3$, $CF_3CF_2CF_2CF_2OCHClCH_3$, perfluoropiperidino-$CF_2CF_2CF_2OCHCl_2$, perfluoropiperidino-$CF_2CF_2CF_2OCH_2Cl$, $(CF_3)_2CFCF(C_2F_5)OCH_2Cl$ and $(CF_3)_2CFCF(C_2F_5)OCHCl_2$.

Suitable hydrochlorocarbons and hydrobromocarbons include HCCs and HBCs such as trans-1,2-dichloroethylene, trichloroethylene, perchloroethylene, 1,1,1-trichloroethane and n-propyl bromide.

Suitable fluorinated compounds containing at least one aromatic moiety include fluorinated monoalkyl-, dialkyl- and trialkyl-substituted aromatic compounds, including toluene and xylene derivatives. Preferred among these compounds are fluoroalkyl substituted compounds, such as hexafluoroxylene, benzotrifluoride and p-chlorobenzotrifluoride. Such compounds are commercially available, for example, under the "OXSOL" trade name from Occidental Chemical Corp., Niagara Falls, N.Y.

Suitable perfluoroiodides include PFIs such as perfluoropropyl iodide ($C_3F_7I$) and perfluorobutyl iodide ($C_4F_9I$).

EXAMPLE

Figure 3:
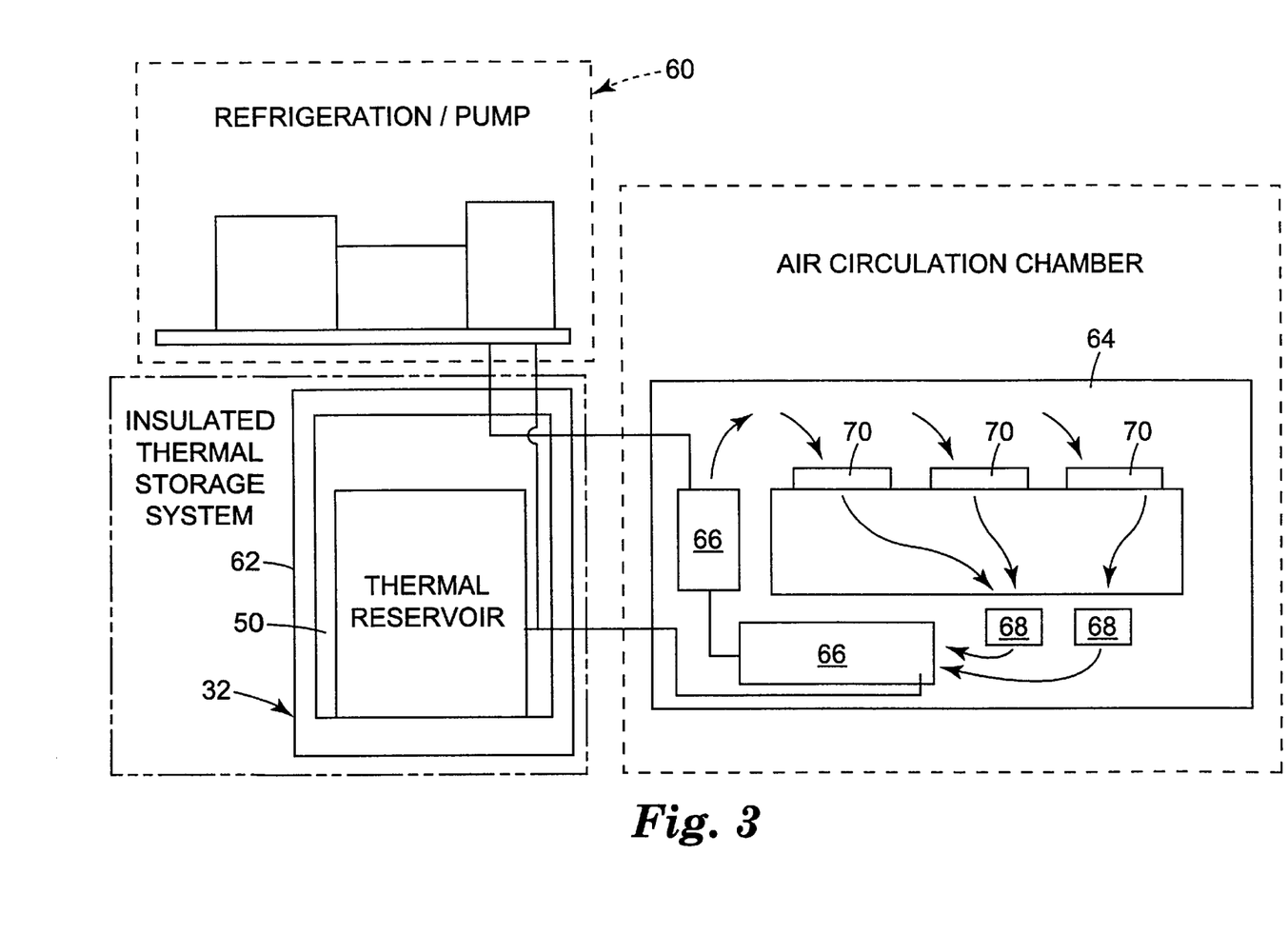
FIG. 3 is a schematic illustration of selected components of a multistage refrigeration system of the present invention.

An experiment was run with a multistage refrigeration system with a thermal reservoir located in the second refrigeration loop to quickly transfer heat away from six cases of 20 oz (570 ml) bottles, 24 bottles per case, filled with either regular or diet Coca-Cola™ soft drink. A schematic illustration of the specific test system layout is illustrated in FIG. 3.

The equipment used for the blast cooling experiment was as follows:

Refrigeration/Pump System (¾ hp, 5700 BTU/hr (1670 W) capacity):

(6) Tecumseh Compressor, Model AK 171AT, 0.7 hp (520 W), 120V, 13 amp, air cooled condenser, with R-404a refrigerant (refrigerant available from E. I dupont de Nemours & Co., Wilmington, Del.) (compressor 20); and (2) Laing Magnetic Coupled Pump, Model SM-1212-NTW, 1/12 hp (60 W), 120V, 1 amp (available from Arrow Tank and Engineering, Minneapolis, Minn.) (pump 60).

Insulated Thermal Storage System:

18 in×18 in×18 in (46 cm×46 cm×46 cm) plastic basin, insulated, with an outside galvanized sheet metal covering (reservoir chamber 50)

16 in×16 in×16 in (41 cm×41 cm×41 cm) tube fin coil assembly, 8 circuits, 2 passes, ⅜ in (1 cm) O.D. tubes made of copper, 10 fins per inch (4 fins per cm) (tubing 44 and fins 47)

28 in×28 in×28 in (71 cm×71 cm×71 cm) plywood box, with 1.5 in (3.8 cm) insulation on all six sides (reservoir shell 62)

Thermal reservoir material: 220 lb (100 kg) of a solution consisting of 20 percent by weight of potassium formate in water (thermal reservoir material 52)

Air Circulation Chamber

Stainless steel insulated cabinet, 28 in wide×30 in deep×70 in long (71 cm wide×76 cm deep×178 cm long) (air circulation cabinet 64)

Cooling coils (2)—the first 6.25 in high×24 in wide×18 in deep (16 cm high×61 cm wide×46 cm deep), 5 circuits, 16 passes, ⅜ in (1 cm) O.D. tubes made of copper, 4 fins/in (1.6 fins/cm); the second 6.25 in high×24 in wide×9 in deep (16 cm high×61 cm wide×23 cm deep), 5 circuits, 8 passes, ⅜ in (1 cm) O.D. tubes made of copper, 4 fins/in (1.6 fins/cm) (cooling coil or heat exchanger assemblies 66)

Blowers—Papst Backward Curved AC Impeller, P/N R4E310AE13-17 (blowers 68)

Primary to Secondary Heat Exchanger:

Doucette Industries coaxial copper coil heat exchanger, P/N CX-H 075

Total System Power Requirements:

Compressor: 120V, 13 amp

Pump: 120V, 1 amp

Blowers (2): 120V, 1 amp

Total: 120V, 15 amps

The compressor 20 employed in the first refrigeration loop 12 has an energy rate removing capacity of 5700 BTU/hr (1670 W), as indicated by the data in TABLE 1 and the manufacturer's specifications. However, in order to cool the six cases of bottles (plastic bottle cases 70 in FIG. 3) from 72° F. (22° C.) to less than 40 F. (4° C.), a substantially higher heat flow rate was required. To accomplish this, the third refrigeration loop 16 was closed and the first refrigeration loop 12 was opened. Then the compressor 20 in the first refrigeration loop 12 was started up to cool the first refrigerant medium, R-404a. The second refrigerant medium, HFE-7100, cooled by the first refrigerant medium via the first heat exchanger 26, in turn cooled (over a period of several hours) the thermal reservoir material 52 to the desired temperature of 20° F. (−7° C.). After the thermal reservoir material 52 reached 20°° F. (−7° C.), the first refrigeration loop 12 continued to operate and the third refrigeration loop 16 was opened. The second refrigerant medium was then circulated through the second heat exchanger 34 to transfer heat between the thermal reservoir 32 and the air circulation chamber 42 in the third refrigeration loop 16.

TABLE 1 shows the thermal load (i.e., heat transfer and temperature) data from this experiment as a function of time for a period of 42 minutes. The data listed under the "Energy Rate from Air" column indicate the rate of heat transfer in BTU/hr (watts) at a given time while the bottles are cooling to their desired temperature (approaching 32° F. or 0° C.). Initially, this rate was over 40,000 BTU/hr (11700 W), roughly 7 times the capacity of the compressor 20 in the first refrigeration loop 12. The data listed under the "Energy Rate to Thermal Storage" column indicate the rate of energy adsorption by the thermal reservoir 32.

By examining the data in TABLE 1, the advantages of utilizing a thermal reservoir 32 along with secondary refrigeration become clear. The average temperature of the Coca-Cola™ soft drink bottles had reach 40° F. (4° C.) within 25 minutes and 32° F. (0° C.) within 41 minutes. The rate of energy removal from the air in the cooling chamber 42 was continually far greater than the capacity of the small refrigeration/pump system, even at the end of the experiment. This multistage cooling system as described operated using a simple 120 V power source. A traditional refrigeration system without thermal storage would require a huge compressor with the capacity of 40,000 BTU/hr (11700 W) (requiring a significantly larger power input) to perform comparably.

TABLE 1

| Time, min | Energy Rate from Air, BTU/hr (W) | Energy Rate to Thermal Storage, BTU/hr (W) | Energy Rate of Compressor, BTU/hr (W) | Drink Bottle Temperature, ° F. (° C.) |
| --- | --- | --- | --- | --- |
| 0 | 1,440 (420) | 42,463 (12,400) | 4,516 (1,320) | 74 (23) |
| 1 | 41,896 (12,300) | 38,654 (11,300) | 4,593 (1,350) | 71 (22) |
| 2 | 34,893 (10,200) | 35,186 (10,300) | 4,595 (13,500) | 69 (21) |
| 3 | 31,339 (9,200) | 31,376 (9,200) | 4,647 (1,360) | 67 (19) |
| 4 | 28,785 (8,400) | 28,202 (8,300) | 4,774 (1,400) | 65 (18) |
| 5 | 26,697 (7,820) | 25,699 (7,500) | 4,876 (1,430) | 64 (18) |
| 6 | 24,936 (7.310) | 23,667 (6,930) | 4,928 (1,440) | 62 (17) |
| 7 | 23,506 (6,890) | 21,836 (6,400) | 4,956 (1,450) | 60 (16) |
| 8 | 22,164 (6,490) | 20,393 (5,980) | 5,108 (1,500) | 58 (15) |
| 9 | 21,063 (6,170) | 19,134 (5,610) | 5,210 (1,530) | 57 (14) |
| 10 | 20,128 (5,900) | 17,981 (5,270) | 5,263 (1,540) | 55 (13) |
| 12 | 18,506 (4,630) | 16,119 (4,720) | 5,444 (1,600) | 52 (11) |

TABLE 1-continued

| Time, min | Energy Rate from Air, BTU/hr (W) | Energy Rate to Thermal Storage, BTU/hr (W) | Energy Rate of Compressor, BTU/hr (W) | Drink Bottle Temperature, °F. (°C.) |
|---|---|---|---|---|
| 14 | 17,254 (5,060) | 14,596 (4,280) | 5,650 (1,660) | 50 (10) |
| 16 | 16,210 (4,750) | 13,321 (3,900) | 5,605 (1,640) | 48 (9) |
| 18 | 15,222 (4,460) | 12,224 (3,580) | 5,486 (1,610) | 46 (8) |
| 20 | 14,448 (4,230) | 11,271 (3,300) | 5,943 (1,740) | 44 (7) |
| 24 | 13,197 (3,870) | 9,663 (2,830) | 5,729 (1,680) | 41 (5) |
| 28 | 12,084 (3,540) | 8,413 (2,470) | 6,270 (1,840) | 38 (3) |
| 32 | 11,181 (3,280) | 7,304 (2,140) | 6,307 (1,850) | 36 (2) |
| 36 | 10,430 (3,060) | 6,454 (1,890) | 6,498 (1,900) | 34 (1) |
| 40 | 9,730 (2,850) | 5,616 (1,640) | 6,587 (1,930) | 33 (1) |
| 42 | 9,456 (2,770) | 5,286 (1,550) | 6,645 (1,950) | 32 (0) |

Although the present invention has been described with reference to preferred embodiments, workers skilled in the art will recognize that changes may be made in form and detail without departing from the spirit and scope of the invention.

What is claimed is:

1. A refrigeration system comprising:
    a first refrigeration loop with a first refrigerant disposed therein;
    a second refrigeration loop with a second refrigerant disposed therein;
    a first heat exchanger for transferring heat from the second refrigerant to the first refrigerant;
    a thermal reservoir in the second refrigeration loop storing a thermal reservoir material in heat exchange relation with the second refrigerant;
    a third refrigeration loop with a third refrigerant disposed therein; and
    a second heat exchanger for transferring heat from the third refrigerant to the second refrigerant.

2. The refrigeration system of claim 1, wherein the second refrigerant has a boiling point ranging from about 15° to about 200° C. and a freezing point ranging from about 0° to about −150° C.

3. The refrigerant system of claim 1, wherein the second refrigerant has a boiling point ranging from about 50° C. to about 110° C.

4. The refrigerant system of claim 1, wherein the second refrigerant is selected from the group consisting of perfluorocarbons (PFCs), perfluoropolyethers (PFEs), hydrofluorocarbons (HFCs), hydrofluoroethers (HFEs), hydrochlorofluorocarbons (HCFCs), hydrochlorofluoroethers (HCFEs), chlorofluorocarbons (CFCs), hydrochlorocarbons (HCCs), hydrobromocarbons (HBCs), fluorinated compounds containing at least one aromatic moiety, and perfluoroiodides (PFIs).

5. The refrigeration system of claim 1, wherein the second refrigerant is a hydrofluoroether (HFE) selected from the group of segregated HFEs, non-segregated HFEs, and blends of segregated HFEs with organic solvents.

6. The refrigeration system of claim 1, wherein the second refrigeration is a hydrofluorocarbon (HFC) selected from the group of (1) $C_3H_nF_{8-n}$, wherein $1 \leq n \leq 4$, (2) $C_4H_nF_{10-n}$, wherein $1 \leq n \leq 5$, (3) $C_5H_nF_{12-n}$, wherein $1 \leq n \leq 6$, (4) $C_5H_nF_{10-n}$, wherein $1 \leq n \leq 5$, (5) $C_6H_nF_{14-n}$, wherein $n \leq 7$, (6) $C_7H_nF_{16-n}$, wherein $n \leq 8$, and (7) $C_8H_nF_{18-n}$, wherein $n \leq 9$.

7. The refrigeration system of claim 1, wherein the thermal reservoir has a freezing point ranging from about 0° to about −40° C.

8. The refrigeration system of claim 1, wherein the thermal reservoir material has a freezing point of about −7° C.

9. The refrigeration system of claim 1, wherein the third refrigerant is air.

10. The refrigeration system of claim 1, wherein the second refrigerant has a liquid state within a defined temperature range, and wherein the thermal reservoir material has its freezing point temperature within the defined temperature range.

11. The refrigeration system of claim 1, wherein the thermal reservoir is adapted to retain the thermal reservoir material therein when the material is in a liquid state and when the material is in a solid state.

12. The refrigeration system of claim 1, and further comprising:
    a conduit in the second refrigeration loop for diverting the second refrigerant to selectively bypass the second heat exchanger.

13. The refrigeration system of claim 1, and further comprising:
    a cooling chamber in the third refrigeration loop.

14. The refrigeration system of claim 1, and further comprising:
    a compressor for transferring heat from the first refrigerant to the ambient temperature.

15. A multistage refrigeration process comprising:
    cooling a first refrigerant in a first refrigerant loop by transferring heat from the first refrigerant to the ambient temperature;
    cooling a second refrigerant in a second refrigerant loop by transferring heat from the second refrigerant to the first refrigerant in a first heat exchanger;
    cooling a thermal reservoir material disposed in a thermal reservoir in the second refrigerant loop until a desired temperature for the thermal reservoir material is attained by transferring heat from the thermal reservoir material to the second refrigerant in the thermal reservoir;
    cooling a third refrigerant in a third refrigerant loop by transferring heat from the third refrigerant to the second refrigerant in a second heat exchanger; and
    cooling the second refrigerant by transferring heat retained therein from the third refrigerant to the thermal reservoir material in the thermal reservoir.

16. The multistage refrigeration process of claim 15, wherein the third refrigerant loop includes a cooling chamber, and further comprising:
    transferring heat from objects in the cooling chamber to the third refrigerant.

17. The multistage refrigeration process of claim 16, and further comprising:

cooling the objects in the cooling chamber to a predetermined final temperature;

removing the objects from the cooling chamber, at a desired removal rate; and the fifth cooling step further includes pulsing the rate of circulation of the second refrigerant through the second refrigeration loop to maintain a suitable temperature in the cooling chamber until all of the objects have been removed therefrom.

18. The multi-stage refrigeration process of claim 15, and further comprising:

excluding the second heat exchanger from second refrigerant flow until the thermal reservoir material has reached the desired temperature.

19. The multi-stage refrigeration process of claim 15, wherein as heat is transferred from the thermal reservoir material to the second refrigerant, the thermal reservoir material undergoes a phase change from a liquid state to a solid state as it approaches the desired temperature.

20. The multi-stage refrigeration process of claim 15, and further comprising:

selecting the second refrigerant from the group consisting of the refrigerant system of claim 1, wherein the second refrigerant is selected from the group consisting of perfluorocarbons (PFCs), perfluoropolyethers (PFEs), hydrofluorocarbons (HFCs), hydrofluoroethers (HFEs), hydrochlorofluorocarbons (HCFCs), hydrochlorofluoroethers (HCFEs), chlorofluorocarbons (CFCs), hydrochlorocarbons (HCCs), hydrobromocarbons (HBCs), fluorinated compounds containing at least one aromatic moiety, and perfluoroiodides (PFIs).

21. The multi-stage refrigeration process of claim 15, wherein the second refrigerant is a hydrofluoroether (HFE) selected from the group consisting of segregated HFEs, non-segregated HFEs, and blends of segregated HFEs with organic solvents.

22. The multi-stage refrigeration process of claim 15, wherein the second refrigerant is a hydrofluorocarbon (HFC) selected from the group consisting of (1) $C_3H_nF_{8-n}$, wherein $1 \leq n \leq 4$, (2) $C_4H_nF_{10-n}$, wherein $1 \leq n \leq 5$, (3) $C_5H_nF_{12-n}$, wherein $1 \leq n \leq 6$, (4) $C_5H_nF_{10-n}$, wherein $1 \leq n \leq 5$, (5) $C_6H_nF_{14-n}$, wherein $n \leq 7$, (6) $C_7H_nF_{16-n}$, wherein $n \leq 8$, and (7) $C_8H_nF_{18-n}$, wherein $n \leq 9$.

* * * * *

UNITED STATES PATENT AND TRADEMARK OFFICE
CERTIFICATE OF CORRECTION

PATENT NO. : 6,148,634
DATED : November 21, 2000
INVENTOR(S) : Gregory J. Sherwood It is certified that error appears in the above-identified patent and that said Letters Patent is hereby corrected as shown below:

Column 6,
Line 3, delete "as".

Column 9,
Line 17, delete "Inc.," and insert in place thereof -- Inc.), --.

Column 12,
Line 42, delete the word "groups" and insert in place thereof -- group --.

Column 16,
Line 3, delete "$C_7F_{15}OCFHC_3$," and insert in place thereof -- $C_7F_{15}OCFHCF_3$, --

Column 18,
Line 18, delete "20°°F." and insert in place thereof -- 20°F. --.

Column 18, Table 1,
Number 6, delete "(7.310)" and insert in place thereof -- (7,310) --.

Signed and Sealed this

First Day of January, 2002

Attest:

JAMES E. ROGAN
*Attesting Officer*  *Director of the United States Patent and Trademark Office*